United States Patent
Adamek

[19]

[11] Patent Number: 6,012,759
[45] Date of Patent: Jan. 11, 2000

[54] RETRACTABLE VEHICLE COVER

[76] Inventor: Thad R. Adamek, 945 Duncan Rd., South Daytona, Fla. 32119

[21] Appl. No.: 09/118,113

[22] Filed: Jul. 17, 1998

[51] Int. Cl.[7] ...................................................... B60J 11/00
[52] U.S. Cl. ............................................. 296/136; 296/98
[58] Field of Search ........................... 296/98, 136, 95.1; 160/314, 23.1, 24, 323.1, 370.21, 370.22; 150/166

[56] References Cited

U.S. PATENT DOCUMENTS

| | | |
|---|---|---|
| 1,999,171 | 4/1935 | Bryant . |
| 2,871,931 | 2/1959 | Hastings . |
| 3,050,075 | 8/1962 | Kaplan et al. . |
| 3,563,594 | 2/1971 | London . |
| 4,732,421 | 3/1988 | Ross et al. . |
| 4,828,319 | 5/1989 | Benson . |
| 4,834,446 | 5/1989 | Tung-Chow . |
| 4,856,842 | 8/1989 | Ross et al. . |
| 4,929,016 | 5/1990 | Kastanis ................................. 296/136 |
| 5,078,446 | 1/1992 | Walter . |
| 5,378,035 | 1/1995 | Wu . |
| 5,433,499 | 7/1995 | Wu ......................................... 296/95.1 |
| 5,462,329 | 10/1995 | Cheng . |
| 5,516,181 | 5/1996 | Thompson . |
| 5,655,807 | 8/1997 | Rosario ................................... 296/98 |
| 5,762,393 | 6/1998 | Darmas, Sr. ............................. 296/98 |
| 5,775,765 | 7/1998 | Kintz ....................................... 296/98 |

Primary Examiner—D. Glenn Dayoan
Assistant Examiner—Lori L Coletta
Attorney, Agent, or Firm—Paul S. Rooy

[57] ABSTRACT

A retractable vehicle cover comprising at least one cover reel and at least one extension line reel disposed within a housing. The cover reel and the extension line reel are biased in a retracted position. Each cover reel contains a cover, and each extension line reel contains an extension line. At least one cover leading edge extends from the housing, and at least one extension line extends through each cover leading edge. An extension line cover stop allows the extension line(s) to extend a cover, and an extension line end stop prevents extension line retraction into the housing. The housing is aerodynamically shaped to reduce drag on a vehicle upon which the retractable vehicle cover is mounted. Each cover leading edge is equipped with a cover strip magnet which holds the cover in an extended position. In the alternative, the cover strip magnet may be adhered to a ferromagnetic strip on the housing, which securely holds the cover leading edge in a retracted position. The housing may comprise a housing strip magnet by means of which the retractable vehicle cover may be removably mounted on a vehicle.

16 Claims, 5 Drawing Sheets

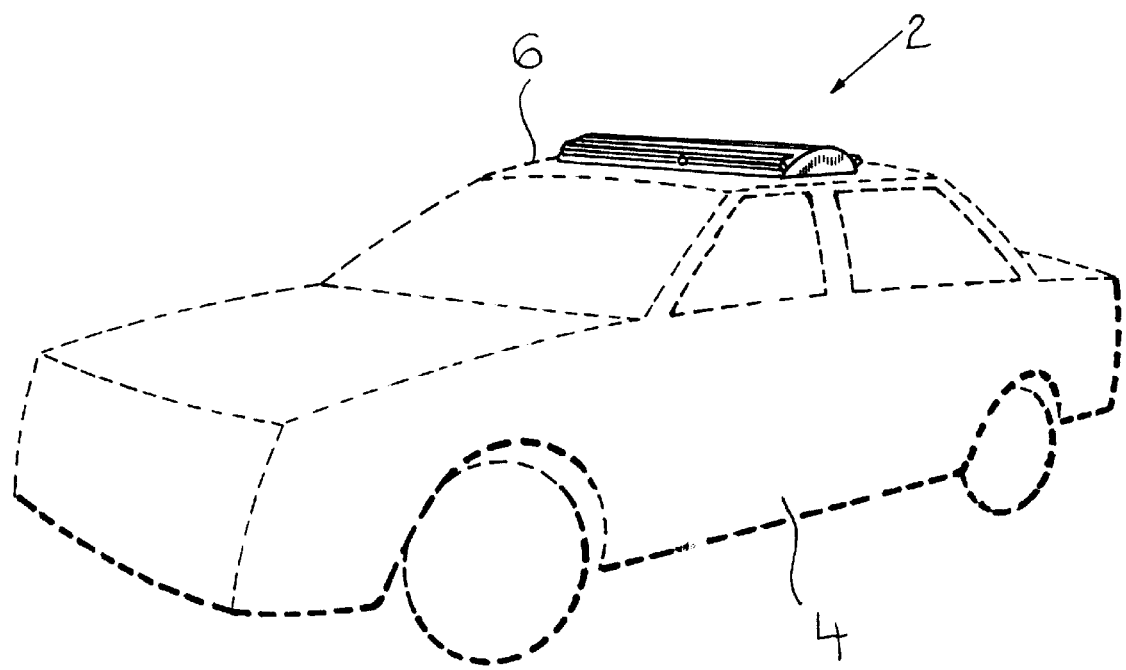

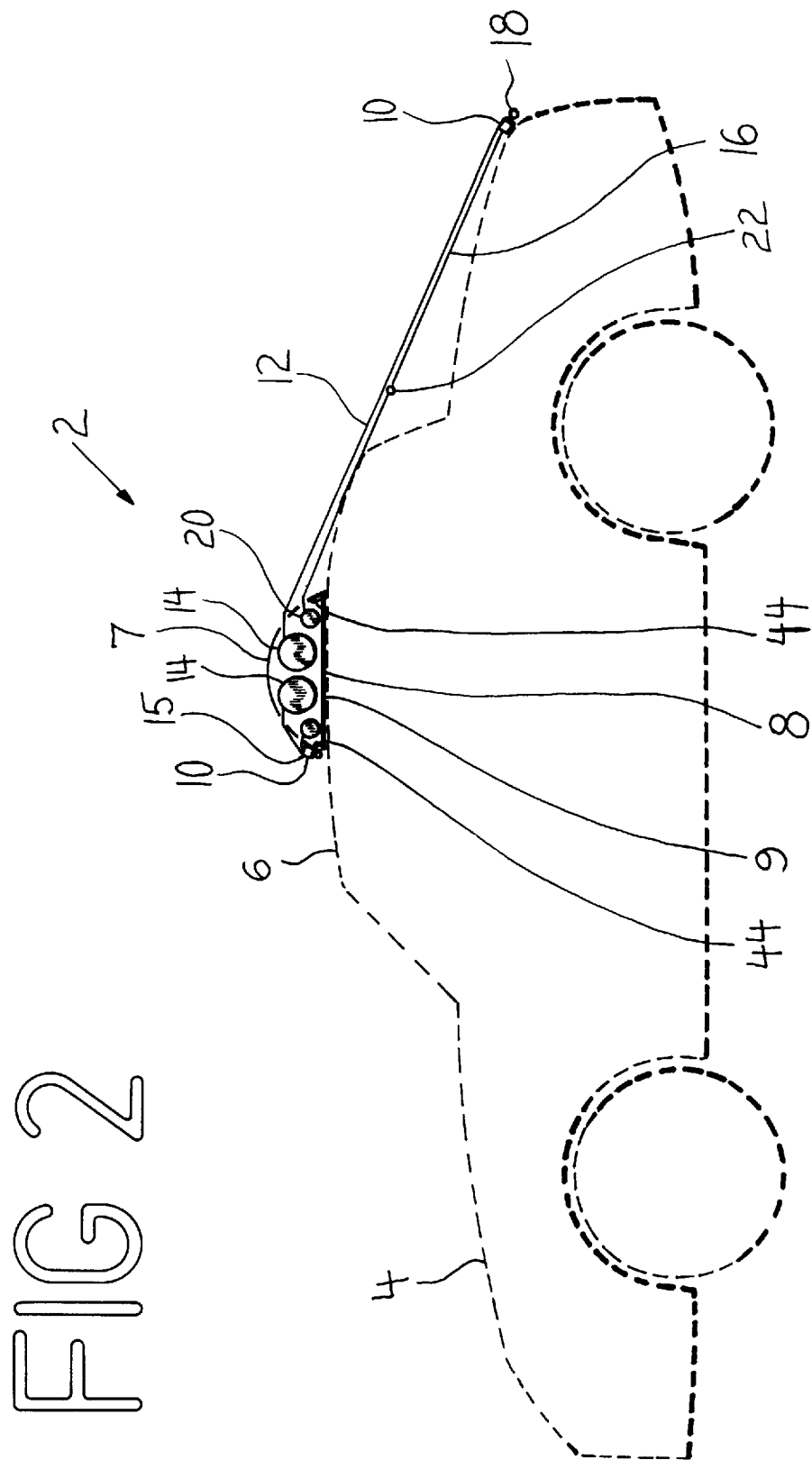

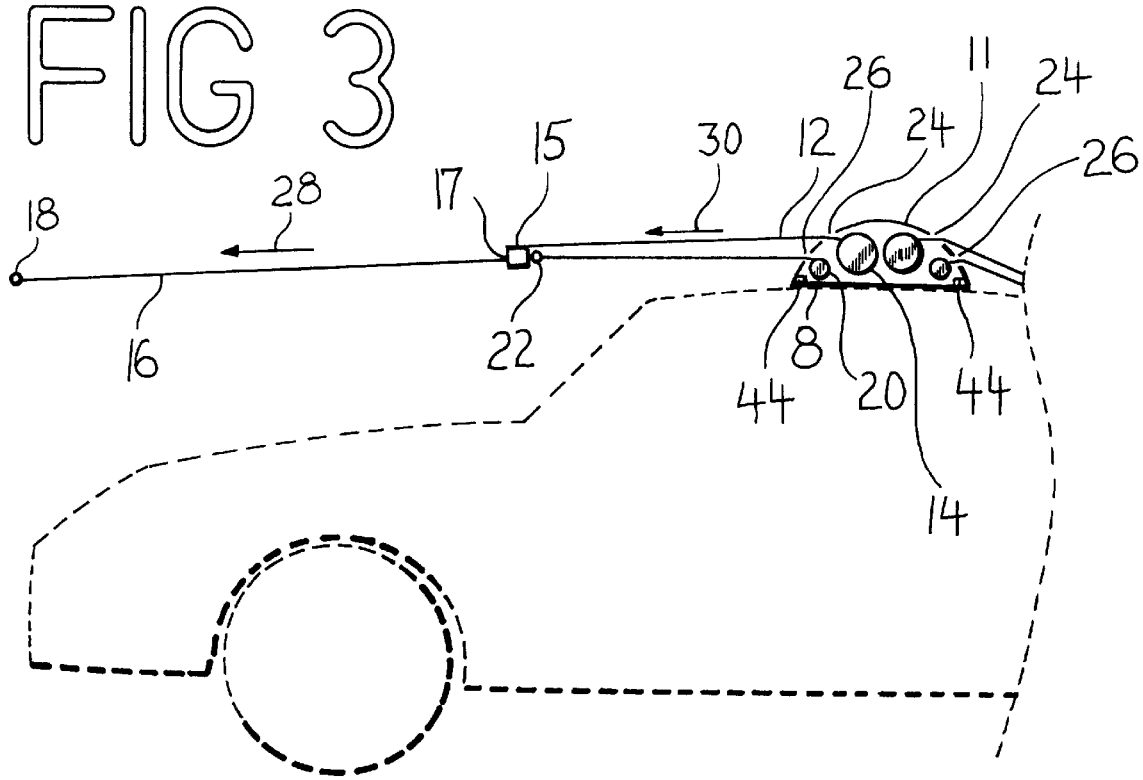
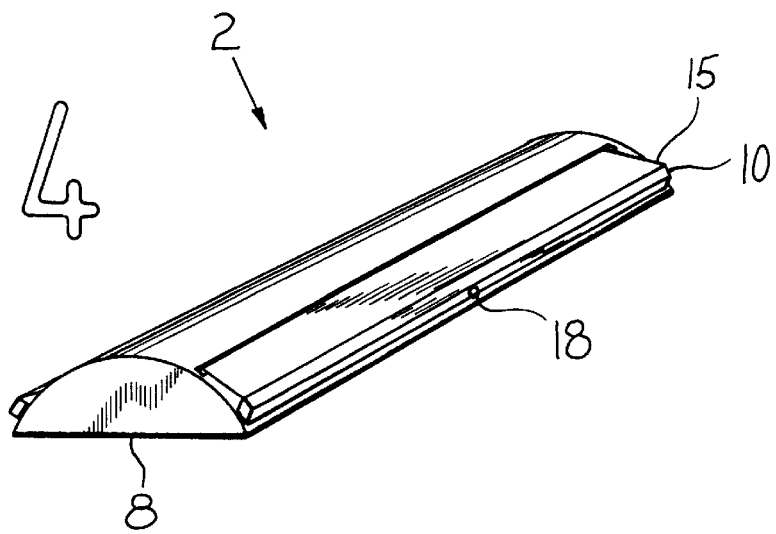

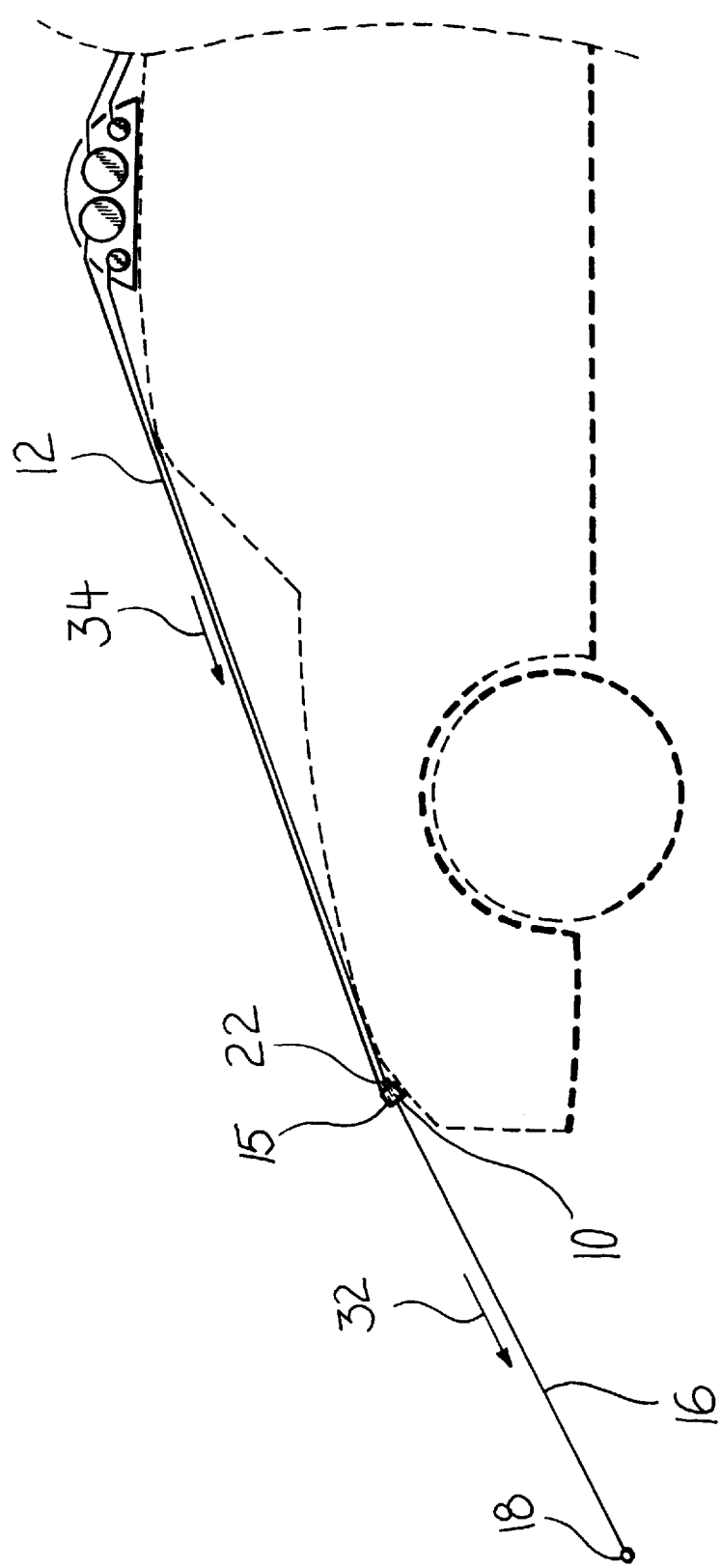

RETRACTABLE VEHICLE COVER

BACKGROUND OF THE INVENTION

1. Field of the Invention

This invention relates to vehicle covers, and in particular to a retractable vehicle cover.

2. Background of the Invention

In many countries, the automobile has become the most common method of transportation. Most automobiles are manufactured primarily of metal, and the metal is painted to protect it from oxidation and other influences detrimental to the finish. Automobile surface finish degradation may be caused by sun rays, bird droppings, tree sap and pollens, snow and ice, frost, etc.

One way to prevent damage to the surface finish of an automobile is to store the car in a garage when it is not being used. Unfortunately, there are many more cars than garages, so this solution leaves many cars "out in the cold".

Another way to help preserve the finish on an automobile or other vehicle is to cover the vehicle with a vehicle cover when it is not in use. Such vehicle covers are generally made of a fabric or textile such as canvas. The vehicle cover may be stored in a convenient place such as the car trunk, then taken out and unfolded, and then installed on the vehicle. When the vehicle must be used, the cover is removed, allowed to dry (if necessary), folded up, and stored. One problem associated with this design is inconvenience: it takes time to fold and unfold, and store, the vehicle cover.

One variant on the vehicle cover solution is the self-storing vehicle cover. This type of cover is typically provided in a container which may be used to store the cover. When the cover is to be used, the cover is removed from the container, and when the cover is to be stored, it is returned to the container. A number of self-storing vehicle covers have been patented, but they all suffer from various problems.

EXISTING DESIGNS

U.S. Pat. No. 5,516,181 was granted Thompson for a roll-up vehicle cover. This cover could be rolled up around a cylinder, which could then be stored in the vehicle's trunk. While this design provided for a storable cover, it was inconvenient and cumbersome to use, because after use, the cover had to be removed from the vehicle roof, manually rolled up, the bundle carried to the trunk of the vehicle, the trunk opened, the bundle placed inside, and the trunk closed. Deployment of this cover required all these steps to be performed, but in the reverse order.

Tung-Chow was granted U.S. Pat. No. 4,834,446 for a road vehicle flexible cover which was stored in a box in the vehicle trunk. While this design provided for motorized retraction of the cover, its storage box occupied a substantial amount of the trunk floor space, right in the center part of the trunk floor. In addition, this design required the trunk be opened and closed every time the cover was deployed or stored. The '446 design was also necessarily complex because it used an electric motor with an electrical wire running to the dash of the vehicle.

Ross et al. were granted U.S. Pat. Nos. 4,732,421 and 4,856,842 for a rolled-up car cover which mounted to the rear bumper of the vehicle. Like the '446 design, the Ross et al. design taught an electrical motor with which to retract the cover, powered by an external 110 volt source. As disclosed, when retracted the Ross cover hung down below the rear bumper of the car, thus decreasing the vehicle ground to rear bumper clearance. In this position, the rolled-up cover would be routinely drenched with muddy water when the car drove through puddles, and the rolled-up cover was exposed to the elements. The danger of electrical shock seems very real in this design, where the operator was expected to plug in an external 110 volt power source into a possibly dripping wet receptacle on the side of the cover roller assembly.

U.S. Pat. Nos. 1,999,171, 2,871,931 and 3,050,075 were granted Bryant, Hastings and Kaplan et al. respectively. While these designs all taught dual, spring-loaded rollers around which car covers could be retracted, they were cumbersome to attach to the roof of a vehicle. In addition, they were not aerodynamically shaped, and thus created substantial drag at highway speeds. Finally, no extension aid was taught, which would assist an individual deploying the cover in extending the cover over the car.

SUMMARY OF THE INVENTION

Accordingly, it is an object of the present invention to provide a retractable vehicle cover which quickly and easily installs and de-installs from the roof of a vehicle. Design features allowing this object to be accomplished include a housing lower surface comprising a housing strip magnet. Advantages associated with the accomplishment of this object include convenience and time savings.

It is another object of the present invention to provide a retractable vehicle cover which extends and retracts quickly and easily. Design features allowing this object to be accomplished include a cover rolled up around a cover reel, an extension line extending through a cover leading edge, an extension line end stop and an extension line cover stop on the extension line, and a flexible cover strip magnet attached to the cover leading edge. Benefits associated with the accomplishment of this object include convenience and time savings, and the ability of a person of reduced stature to extend the cover where such extension would otherwise be impossible.

It is still another object of this invention to provide a retractable vehicle cover which retracts easily. Design features enabling the accomplishment of this object include a spring-loaded cover reel and extension line reel, a cover strip magnet attached to a cover leading edge, and a ferromagnetic strip. Advantages associated with the realization of this object include convenience and time savings, and the ability of a person of reduced stature to retract the cover where such retraction would otherwise be impossible.

It is another object of the present invention to provide a retractable vehicle cover which incorporates a low-profile housing. Design features allowing this object to be accomplished include a housing having an acute housing leading edge angle and an acute housing trailing edge angle. Benefits associated with the accomplishment of this object include reduced aerodynamic drag and greater security of attachment between the retractable vehicle cover and a vehicle top.

It is yet another object of this invention to provide a retractable vehicle cover which is easy and inexpensive to make. Design features allowing this object to be achieved include the use of components made of readily available, inexpensive materials. Benefits associated with reaching this objective include reduced cost, and hence increased availability.

BRIEF DESCRIPTION OF THE DRAWINGS

The invention, together with the other objects, features, aspects and advantages thereof, will be more clearly understood from the following in conjunction with the accompanying drawings.

Five sheets of drawings are provided. Sheet one contains FIG. 1. Sheet two contains FIG. 2. Sheet three contains FIGS. 3 and 4. Sheet four contains FIG. 5. Sheet five contains FIGS. 6 and 7.

FIG. 1 is a front quarter isometric view of a retractable vehicle cover mounted on a vehicle.

FIG. 2 is a side cross-sectional view of a retractable vehicle cover mounted on a vehicle.

FIG. 3 is a side cross-sectional view of a retractable vehicle cover whose front cover is in the process of being extended.

FIG. 4 is a front quarter isometric view of a retractable vehicle cover in the retracted position.

FIG. 5 is a side cross-sectional view of a retractable vehicle cover whose front cover is in the process of being extended.

DETAILED DESCRIPTION OF THE PREFERRED EMBODIMENT

FIG. 1 is a front quarter isometric view of retractable vehicle cover 2 mounted on vehicle roof 6 of vehicle 4. Retractable vehicle cover 2 is held in place on top of vehicle roof 6 by means of housing strip magnet 8 (see FIG. 2).

Figure 7:
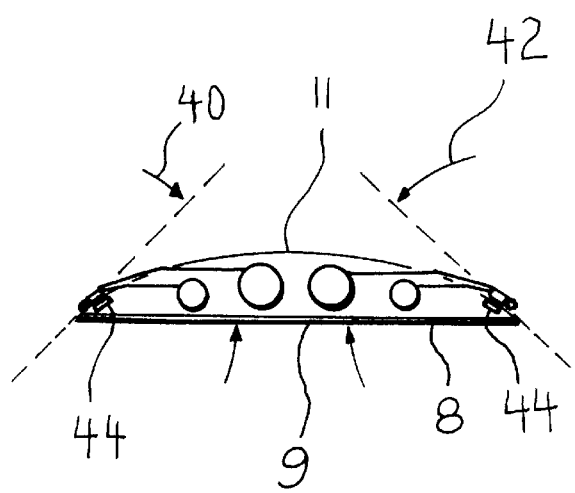
FIG. 7 is a side cross-sectional view of a retractable vehicle cover.

FIG. 2 is a side cross-sectional view of retractable vehicle cover 2 mounted on vehicle roof 6 by means of housing strip magnet 8. A front cover 12 is in the retracted position. A rear cover 12 is extended over the rear of vehicle 4. Retractable vehicle cover 2 comprises at least one cover reel 14 and at least one extension line reel 20 disposed within housing 7. Referring now also to FIG. 7, housing 7 comprises housing upper surface 11 and housing lower surface 9. Housing strip magnet 8 is disposed on housing lower surface 9.

A cover 12 is wrapped around each cover reel 14, and an extension line 16 having an extension line end stop 18 and an extension line cover stop 22 is wrapped around each extension line reel 20. Each cover reel 14 and each extension line reel 20 comprise means of urging each reel into the retracted position. This means may consist of an internal helical spring loading means of the type commonly employed in window shade rolls, a pre-loaded elastic means, or other appropriate means.

Referring now also to FIG. 3, housing upper surface 11 comprises a cover aperture 24 associated with each cover reel 14 through which a cover 12 rolled about such cover reel 14 extends, and an extension line aperture 26 associated with each extension line reel 20 through which an extension line 16 wrapped around such extension line reel 20 extends.

It should be noted that while the accompanying figures depict cover aperture 24 as separate from extension line aperture 26, both apertures could easily be the same aperture. In this case cover 12 and extension line 16 would extend through the same aperture. The instant disclosure is intended to teach an embodiment wherein both a cover 12 and an extension line 16 extend through the same aperture.

Cover leading edge 15 is disposed opposite cover reel 14 on cover 12, and extends through cover aperture 24. Cover strip magnet 10 is disposed along cover leading edge 15, and serves to retain cover 12 extended, or in the alternative, serves to immobilize cover leading edge 15 on housing upper surface 11 when cover 12 is retracted.

FIG. 4 is a front quarter isometric view of retractable vehicle cover 2 with covers 12 and extension lines 16 in the retracted position. Housing upper surface 11 comprises a ferromagnetic strip 44 associated with each cover 12. When covers 12 are in the retracted position, each cover strip magnet 10 is placed on a ferromagnetic strip 44, which serves to neatly immobilize the cover leading edge 15 associated with such cover. This retracted configuration is illustrated in FIGS. 4 and 7.

Figure 6:
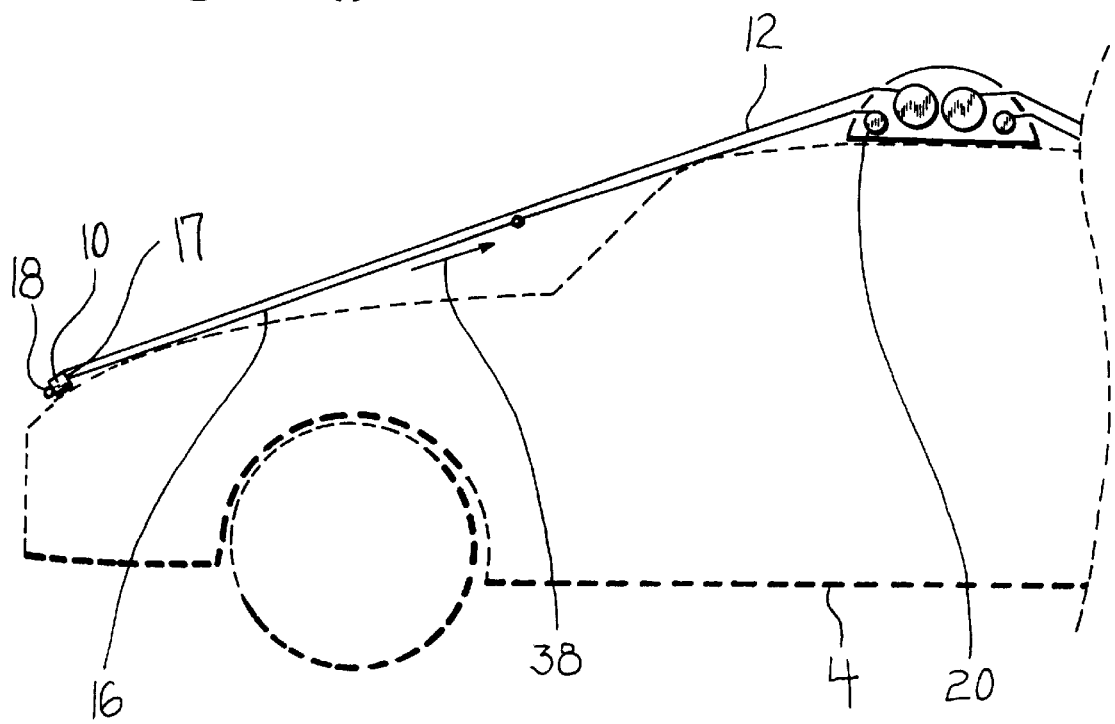
FIG. 6 is a side cross-sectional view of a retractable vehicle cover with its front cover fully extended.

FIGS. 3, 5 and 6 depict a cover 12 being extended. Extension line 16 extends through cover leading edge aperture 17. Extension line 16 comprises extension line end stop 18 having a cross-sectional area greater than that of cover leading edge aperture 17, and extension line cover stop 22 having a cross-sectional area greater than that of cover leading edge aperture 17.

In FIG. 3, extension line 16 has been pulled towards an extreme of vehicle 4 over which cover 12 is to be extended, as indicated by arrow 28. Extension line cover stop 22 has butted against cover leading edge aperture 17, and due to the greater cross-sectional area of extension line cover stop 22, extension line 16 has pulled cover 12 into a partially extended position, as indicated by arrow 30.

In FIG. 5, extension line 16 has further pulled cover 12 as indicated by arrows 32 and 34, until cover leading edge 15 is in the desired position on the extreme of vehicle 4 over which cover 12 is now extended. Cover strip magnet 10 has been allowed to attach to vehicle 4, and cover strip magnet 10 now holds cover leading edge 15 firmly in position against the means of urging cover reel 14 into a retracted position.

The last step of extending cover 12 is depicted in FIG. 6. In FIG. 6, extension line 16 has been released, and it retracts into extension line reel 20 as indicated by arrow 38, due to the means of urging extension line reel 20 into a retracted position. Extension line 16 retracts through cover leading edge aperture 17 until extension line end stop 18 butts against cover leading edge 15, and then can retract no further, due to the greater cross-sectional area of extension line end stop 18 relative to the cross-sectional size of leading edge aperture 17. Thus, as is shown in FIG. 6, cover 12 is extended over the front of vehicle 4, held there securely in place by cover strip magnet 10, and extension line 16 is neatly retracted out of the way.

Cover 12 is retracted by simply disengaging cover strip magnet 10 from vehicle 4, and allowing the means of urging cover reel 4 and extension line reel 20 into a retracted position to reel up cover 12 and extension line 16 until both are retracted within their respective reels. When cover 12 and extension line 16 are in the retracted position, cover leading edge 15 protrudes through cover aperture 24, and extension line end stop 18 protrudes through cover leading edge aperture 17. Cover leading edge 15 is then neatly immobilized by engaging cover strip magnet 10 with ferromagnetic strip 44, thereby holding cover leading edge 15 in place against relative wind experienced by vehicle 4 when moving.

FIG. 7 illustrates the aerodynamic shape of the instant invention, which serves to reduce drag when a vehicle upon which it is mounted is in motion, and also serves to increase the security of attachment between retractable vehicle cover 2 and vehicle 4. Housing upper surface 11 is curved in cross section, and intersects housing lower surface 9 at an acute angle. Housing leading edge angle 40 is defined by a line tangent to housing upper surface 11 at a front edge of housing upper surface 11, and housing lower surface 9. Housing trailing edge angle 42 is defined by a line tangent to housing upper surface 11 at a rear edge of housing upper surface 11, and housing lower surface 9. In the preferred embodiment, the maximum size of housing leading edge angle 40 was 50 degrees, and the maximum size of housing trailing edge angle 42 was 50 degrees.

The instant disclosure drawings disclose two cover reels and two extension line reels. This number is arbitrarily chosen in order to illustrate one embodiment of the instant retractable vehicle cover 2. It is contemplated to be within the scope of this disclosure to teach a retractable vehicle cover 2 which may contain any number of cover reels, e.g. one, two, or more.

While a preferred embodiment of the invention has been illustrated herein, it is to be understood that changes and variations may be made by those skilled in the art without departing from the spirit of the appending claims.

DRAWING ITEM INDEX 2 retractable vehicle cover
4 vehicle
6 vehicle roof
7 housing
8 housing strip magnet
9 housing lower surface
10 cover strip magnet
11 housing upper surface
12 cover
14 cover reel
15 cover leading edge
16 extension line
17 cover leading edge aperture
18 extension line end stop
20 extension line reel
22 extension line cover stop
24 cover aperture
26 extension line aperture
28 arrow
30 arrow
32 arrow
34 arrow
38 arrow
40 housing leading edge angle
42 housing trailing edge angle
44 ferromagnetic strip

I claim:

1. A retractable vehicle cover comprising a housing containing at least one cover reel and at least one extension line reel, said at least one cover reel comprising a cover, said at least one extension line reel comprising an extension line, a cover leading edge extending from said at least one cover reel through a cover aperture, at least one said extension line extending through said cover leading edge, a means of urging said cover reel into a retracted position, and a means of urging said extension line reel into a retracted position.

2. The retractable vehicle cover of claim 1 further comprising a cover strip magnet disposed on said cover leading edge, whereby said at least one cover may be held in an extended position over a vehicle on which said retractable vehicle cover is mounted.

3. The retractable vehicle cover of claim 2 wherein said housing further comprises one ferromagnetic strip associated with each said cover reel, whereby said cover leading edge may be securely held in a retracted position by adhering said cover strip magnet to said ferromagnetic strip.

4. The retractable vehicle cover of claim 3 wherein said cover strip magnet is a flexible magnetic strip, whereby said cover strip magnet may conform to a vehicle shape, and thus hold said at least one cover more securely in an extended position.

5. The retractable vehicle cover of claim 4 wherein said housing comprises a housing lower surface, a housing strip magnet being attached to said housing lower surface, whereby said retractable vehicle cover may be removably installed on a vehicle.

6. The retractable vehicle cover of claim 1 wherein said extension line extends through a cover leading edge aperture, said extension line comprising an extension line end stop and an extension line cover stop, a cross-sectional area of said extension line end stop and a cross-sectional area of said extension line cover stop exceeding a cross-sectional area of said cover leading edge aperture, whereby said extension line may be employed to quickly and easily extend said at least one cover.

7. The retractable vehicle cover of claim 1 wherein said housing comprises a housing upper surface and a housing lower surface, and a housing leading edge angle defined by said housing lower surface and a line tangent to a front edge of said housing upper surface, said housing leading edge angle being 50 degrees or less.

8. The retractable vehicle cover of claim 7 comprising a housing trailing edge angle defined by said housing lower surface and a line tangent to a rear edge of said housing upper surface, said housing trailing edge angle being 50 degrees or less.

9. A retractable vehicle cover comprising a first cover reel and a second cover reel, a first extension line reel, and a second extension line reel contained within a housing, a cover contained in each said cover reel, an extension line contained in each said extension line reel, each said cover comprising a cover leading edge, one said extension line extending through each said cover leading edge, a means of urging said cover reels into a retracted position, and a means of urging said extension line reels into a retracted position.

10. The retractable vehicle cover of claim 9 wherein each said cover leading edge comprises a cover strip magnet whereby said covers may be held in an extended position over a vehicle on which said retractable vehicle cover is mounted.

11. The retractable vehicle cover of claim 10 wherein said housing further comprises one ferromagnetic strip associated with each said cover reel, whereby said cover leading edge may be securely held in a retracted position by adhering said cover strip magnet to said ferromagnetic strip.

12. The retractable vehicle cover of claim 11 wherein said housing further comprises a housing strip magnet, whereby said retractable vehicle cover may be removably installed on a vehicle.

13. A retractable vehicle cover comprising at least one cover reel, said at least one cover reel comprising a cover, a cover leading edge extending from said at least one cover reel through a cover aperture, a means of extending said cover, and a means of urging said cover reel into a retracted position, said means of extending said cover comprising at least one extension line reel disposed within a housing, an extension line contained in said at least one extension line reel, said at least one extension line reel extending through a cover leading edge.

14. The retractable vehicle cover of claim 13 wherein said extension line extends through a cover leading edge aperture, said extension line comprising an extension line end stop and an extension line cover stop, a cross-sectional area of said extension line end stop and a cross-sectional area of said extension line cover stop exceeding a cross-sectional area of said cover leading edge aperture, whereby said extension line may be employed to quickly and easily extend said at least one cover.

15. A retractable vehicle cover comprising at least one cover reel, said at least one cover reel comprising a cover, a cover leading edge extending from said at least one cover reel through a cover aperture, a means of extending said cover, and a means of urging said cover reel into a retracted position, a housing comprising a housing upper surface and a housing lower surface, and a housing leading edge angle defined by said housing lower surface and a line tangent to a front edge of said housing upper surface, said tangent line passing through an intersection of said housing upper surface and said housing lower surface, said housing leading edge angle being 50 degrees or less.

16. The retractable vehicle cover of claim 15 comprising a housing trailing edge angle defined by said housing lower surface and a line tangent to a rear edge of said housing upper surface, said tangent line passing through an intersection of said housing upper surface and said housing lower surface, said housing trailing edge angle being 50 degrees or less.

* * * * *